Dec. 8, 1959     H. J. ZILLER ET AL     2,916,313
ELASTIC SEAL FOR ANTI-FRICTION BEARINGS
Filed June 3, 1955     3 Sheets-Sheet 1
FIG. 1     FIG. 2     FIG. 3
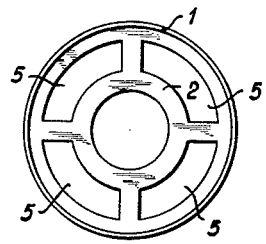
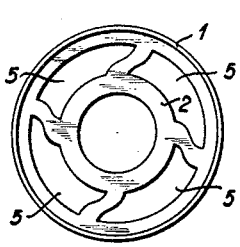
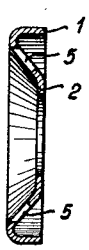
FIG. 4     FIG. 5     FIG. 6
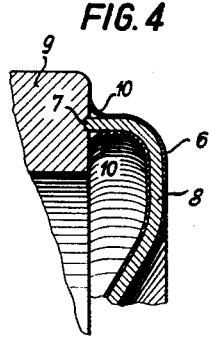
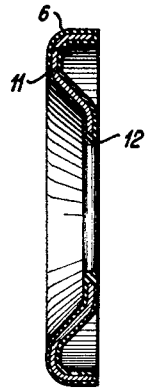
FIG. 7     FIG. 8
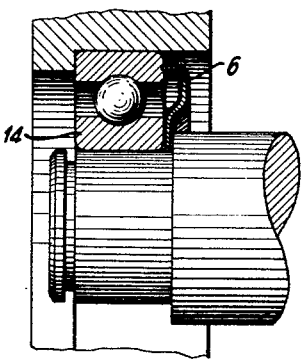
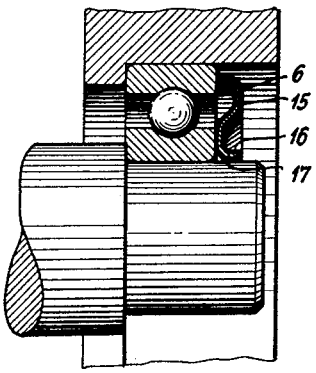

FIG. 9
FIG. 10
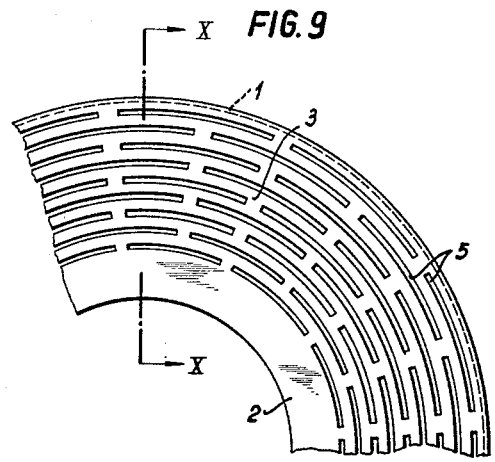
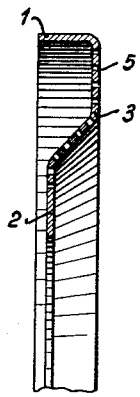
FIG. 11
FIG. 13
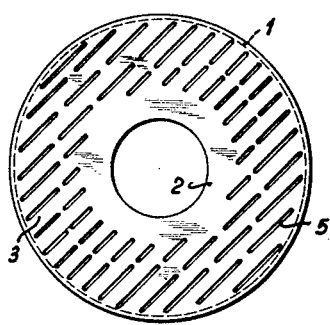
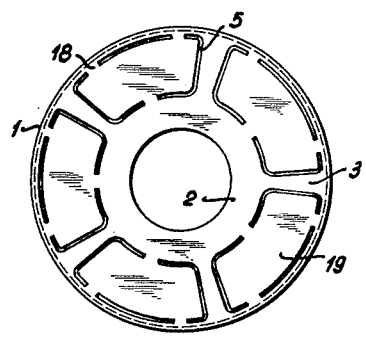
FIG. 12
FIG. 14
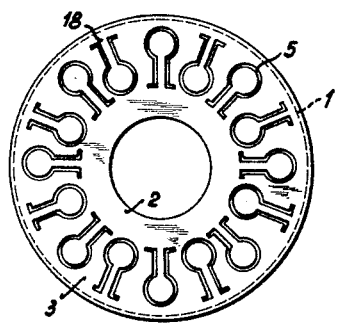
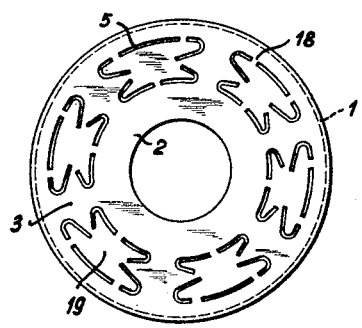

Dec. 8, 1959     H. J. ZILLER ET AL     2,916,313
ELASTIC SEAL FOR ANTI-FRICTION BEARINGS
Filed June 3, 1955     3 Sheets-Sheet 3
FIG. 15
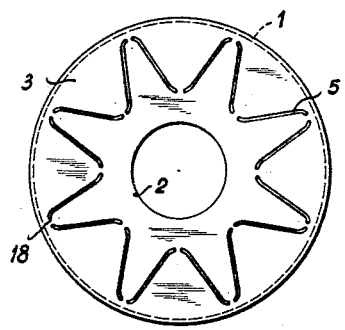
FIG. 16
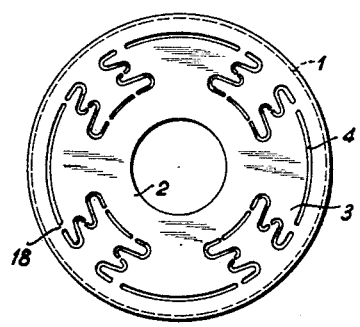
FIG. 17
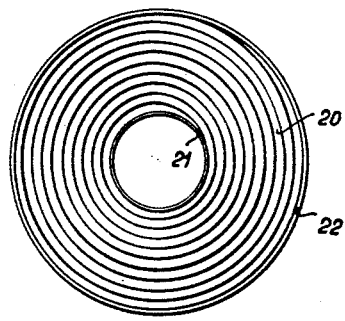
FIG. 18
FIG. 20a
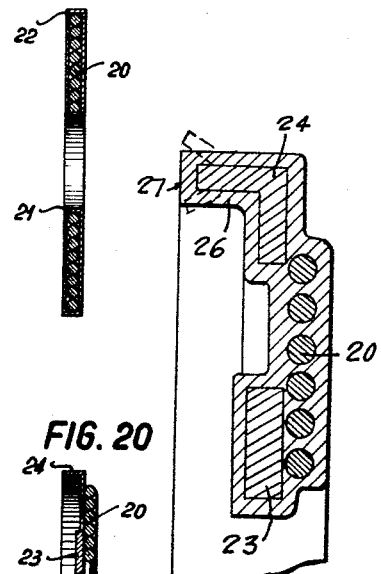
FIG. 19
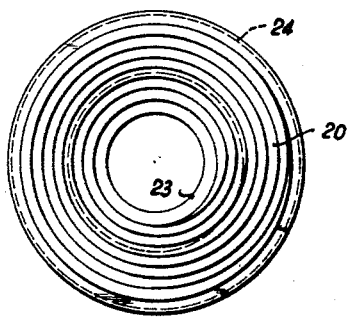
FIG. 20

United States Patent Office 2,916,313
Patented Dec. 8, 1959

2,916,313

ELASTIC SEAL FOR ANTI-FRICTION BEARINGS

Hans J. Ziller, Millrath, uber Hochdahl, and Hans Sikora, Dusseldorf, Germany; said Sikora assignor to said Ziller Application June 3, 1955, Serial No. 513,042

Claims priority, application Germany June 4, 1954

9 Claims. (Cl. 286—11)

The present invention relates to anti-friction bearings and, more particularly, to elastic seals for such bearings.

Various seals for anti-friction bearings are known which seals differ from each other as to design and employed material and act in radial and axial direction. Thus, sealing elements of profiled metal discs are known which depending on the specific design rest by means of their inner or outer sealing edge portion under preload and at a certain engaging pressure against the respective anti-friction bearing ring. In this connection the sealing edge seals by means of its thin end surface and in this way prevents a soiling of the bearing or an escape of grease.

In certain instances of employment, the said seals have certain drawbacks. Thus, for instance, a profiled metal ring is not applicable in connection with self-aligning bearings because said metal ring is too stiff and cannot follow the oscillatory movements of the self-aligning bearings. Inasmuch as also with a cup and cone bearing great tolerances in width may occur between the inner and the outer anti-friction bearing ring, the low springiness of the sealing ring is rather disadvantageous in this connection. If in such an instance the sealing edge is safely and reliably caused to bear, a great preload has to be imparted upon the sealing ring which in turn causes frictional heat which in certain instances may be harmful to the bearing. On the other hand, it may also happen that such a sealing ring lacks sufficient springiness so that the sealing edge will not rest against the respective bearing ring. This is particularly the case when while pressing the anti-friction bearing into the bearing casing the sealing edge of the sealing ring in view of the pressure against the bearing ring and in view of the axial play of the anti-friction bearing, the sealing edge of the sealing ring is bent back to such an extent and remains deformed to such an extent that in normal position of the bearing, the sealing edge of the sealing ring will no longer bear against the bearing ring. Similarly, deficiencies in connection with the lubrication will in many instances make such seals ineffective inasmuch as they can be properly used for greased anti-friction bearings only. A later greasing of the bearings by means of a grease gun is possible to a certain extent only inasmuch as the sealing ring consisting of a rigid metal disc has its sealing edge lifted off from the end surface of the bearing due to the greasing pressure, and since in such an instance the sealing edge cannot return to its original position.

It is, therefore, an object of the present invention to provide an elastic seal for anti-friction bearings which will overcome the above mentioned drawbacks.

It is another object of this invention to provide an elastic seal for anti-friction bearings which is equally successfully applicable with greased as well as with oil-lubricated bearings.

It is a further object of this invention to provide an elastic seal for anti-friction bearings of various types including self-aligning bearings and cup and cone bearings.

A still further object of this invention consists in the provision of an elastic seal for anti-friction bearings of the type set forth in the preceding paragraph, which will produce an effective seal without any undue preload.

These and other objects and advantages of the invention will appear more clearly from the following specification in connection with the accompanying drawings, in which:

Fig. 1 represents a view of a sealing disc according to the present invention.

Fig. 2 is a view similar to that of Fig. 1 differing merely by the shape of the connecting means connecting the outer ring with the inner ring.

Fig. 3 is a section through Fig. 1.

Fig. 4 illustrates how the sealing edge of a coated sealing ring engages a bearing ring.

Fig. 5 and 6 represent sections through coated sealing rings with bead-like increased clamping surfaces.

Figs. 7 and 8 illustrate the assembly or installation of two sealing rings of slightly different design in connection with different shafts supporting the respective anti-friction bearing.

Fig. 9 illustrates a portion of a modified sealing ring with slots said portion of the sealing ring being shown in view.

Fig. 10 is a section taken along the line X—X of Fig. 9.

Fig. 11 shows a sealing ring with straight slots. Fig. 12 illustrates a sealing ring differing from that of Fig. 11 merely by a curved shape of the slots.

Figs. 13 to 16 respectively represent sealing discs with differently shaped slots.

Fig. 17 is a sealing disc made of spirally wound wire.

Fig. 18 shows a section through the disc of Fig. 17.

Fig. 19 is a view of a modified sealing ring having a flanged section connected to a spirally wound disc.

Fig. 20 is a section through Fig. 19.

Fig. 20a shows a portion of Fig. 20 on an enlarged scale.

*General arrangement*

The elastic seal according to the present invention is characterized primarily in that that portion or ring forming the sealing edge is connected with that portion or ring forming the pressure or clamping surface by means of one or more connecting members. These connecting members may be formed by spokes or the like or by a round disc of elastic material. Furthermore, the seal is coated on all sides with a thin synthetic coat or the like which when running in the seal will tear on one of the bearing rings and will snugly fit or rest in the form of lips against said bearing ring. The connecting members which are elastic and may have the shape of spokes may consist of the same or similar material as the sealing edge and the pressure surface. When the connecting member is designed as disc, the latter consists of an elastic material. The resistance and possibility of application of the seal is not to be limited by the material and shape of the elastic connecting member.

The elastic connection between the ring forming the sealing edge and the ring forming the clamping or pressure surface may instead of the above mentioned shapes also be designed in a different manner. The elasticity of the connection will be determined by the respective arrangement of straight or curved spokes which may consist of sheet metal, wire or the like and are fixedly connected to the sealing edge and the clamping or pressure surface. It is expedient to close the free spaces obtained with such an arrangement by means of an elastic rubber-like synthetic material or to coat with such material the entire annular surface between the sealing edge ring and the pressure surface ring so that the disc will obtain the character of a closed sealing disc which will overcome the drawbacks of all heretofore known seals of the above mentioned type.

According to a particularly advantageous embodiment of the invention, the free spaces between the connecting members are slot shaped so that the individual spaces in the ring disc will have long edges and as little surface as possible.

The slot-shaped free spaces may be of various shape and arrangement and may be designed with a round contour closed in itself or with straight or arched lines. The said free spaces or apertures may also be of other shapes, the arrangement of the slots in the ring surface determining the elasticity of the disc which latter may consist of sheet metal or any other resilient material. According to another embodiment of the invention, a wire of small diameter is spirally wound in such a manner that its individual windings are as close to each other as possible. The slot-shaped free space in this instance is located between the individual windings of the wire and therefore is likewise of spiral shape. The sealing edge and pressure or clamping surface may be formed either from the ends of the wire, for instance by flat rolling, or may consist of separate metal rings or the like which are connected with the wire in any convenient manner for instance by hard soldering.

According to the invention, the slot-shaped free spaces or apertures are likewise closed by an elastic rubber-like synthetic material or the like so that the disc will have the character of a closed sealing disc. If desired, the entire ring disc between sealing edge ring and clamping surface ring may be coated with a thin coat of synthetic material or the like so that the above mentioned slot-like free spaces or apertures are likewise closed.

The elastic connecting member may, however, also entirely consist of resilient material of sufficient resistance and may be fixedly connected to the sealing edge and the clamping surface. If such an elastic sealing ring is then covered with the above mentioned thin coat of synthetic material or the like, an additional sealing is obtained at the sealing edge and the clamping surface. In view of this fact, the seal can also be employed in cases where the employment of similar seals was impossible heretofore as for instance in connection with the sealing against acids or lye solutions.

A seal according to the invention may also be employed in connection with oil-lubricated bearings if the coating at the sealing edge is effected in such a manner that it will snugly engage the bearing ring inwardly to hold the lubricant in the bearing while simultaneously preventing soil from entering the bearing from the outside.

Due to the synthetic coating, the sealing element arranged on the shaft when an outwardly sealing disc is employed or arranged in the casing of the anti-friction bearing when an inwardly sealing disc is employed, will prevent the lubricant from escaping at these points. To this end, the coating is provided on the clamping surface on one or both sides thereof with bead-like reinforcements. The clamping surface of the seal may also be provided with a flange corresponding to the shaft supporting the bearing, and the said flange may be covered with an increased layer of synthetic material. Such an elastic sealing disc may also be employed without an additional clamping element. The same material such as steel, copper, brass or the like may be employed for all parts of the ring discs. If desired, and depending on the purpose for which the seal is to be employed, the individual members making up the seal may consist of different materials. However, it is expedient to employ elastic material for the clamping parts and soft material for the sealing surfaces.

*Structural arrangement*

Referring now to the drawings in detail and Figs. 1 to 3 thereof in particular, the seal shown therein comprises a sealing edge portion 1, a clamping or pressure surface portion 2 and connecting means in form of spokes 3 or 4 which may extend in radial direction as shown in Fig. 1 or may be curved as shown in Fig. 2. The thus formed frame is coated with a synthetic material in such a manner that the open spaces 5, 5a be closed by said synthetic material. The frame of the sealing ring is covered on all sides thereof with a synthetic coating 6 as shown in Figs. 4 to 8. According to Fig. 4, the coating 6 of the sealing edge 7 is cut open on the anti-friction bearing ring 9 when the sealing ring 8 is being run in, so that the inwardly and outwardly arranged portions 10 of the coating will snugly engage the bearing ring 9 in a lip-like manner.

According to Fig. 5, the sealing element 11 has the inner edge of the clamping surface provided with an increased deposit 12 of synthetic material, assuming that the outer edge is the sealing edge, so that the seal will tightly seal on the shaft carrying the bearing. When the inner edge is the sealing edge, the seal must correspondingly tightly fit into the casing of the outer bearing ring. A bead 13 located at the inner edge of the clamping surface will likewise yield a good seal as will be evident from Fig. 6. According to Fig. 7, this synthetic bead can snugly rest against the rounded off edges of the inner bearing ring 14 so as to provide an additional seal. This bead may extend to both sides of the sealing ring as shown in Fig. 6 so that when the ring surface is pressed against the bearing ring by means of a spring ring or the like this pressing is effected additionally under elastic pressure.

Such an elastic seal may, however, also be inserted without an additional clamping element as is shown for instance in Fig. 8. In this instance the clamping surface of ring 15 with outwardly sealing edge may be provided with a flange 16 which latter may be coated with an increased synthetic layer 17. If a sealing ring with inner sealing surface is employed, the flanged portion of the clamping surface will accordingly be located in the casing of the bearing.

The metal portion of a seal of the type shown in Figs. 9 and 10 comprises the sealing edge 1b, the clamping surface 2b and the connecting member 3b interposed therebetween. The connecting member 3b is provided with apertures 5b of slot shape. Figs. 11 to 16 illustrate various embodiments of a ring disc with slot-shaped apertures. According to the seal shown in Fig. 11, the slot-shaped apertures 5c are straight, whereas according to Figs. 12 and 13 the apertures 5d and 5e are composed of straight and curved sections. Figs. 14 to 16 illustrate other possible contours of slot-shaped apertures. With all embodiments of this type, webs 18e and 18f confine the slot-shaped apertures so that a portion 19e, 19f cut out for instance in the seals of Figs. 13 and 14 will remain therein.

Figs. 17 and 18 respectively show a view and a section through the metallic portion of a seal made of thin spirally wound wire 20. The start 21 and end 22 of this wire is for instance flattened by rolling and is designed as clamping surface and sealing edge respectively. According to a further embodiment shown in Figs. 19 and 20, the clamping surfaces 23 and the sealing edge 24 are made of metal rings and are hard soldered to the wire spiral 20. The seal of Figs. 19 and 20 is likewise all the way around covered by a coat of elastic material as has been more clearly shown in Fig. 20a. Also in this instance the portion of the coat of elastic material which is designated with the numeral 27 is rather thin and will break after a short running-in period of the ring so as to form lips indicated in Fig. 20a by dash lines.

It is, of course, understood that the present invention is, by no means, limited to the particular constructions shown in the drawings but also comprises any modifications within the scope of the appended claims.

It may also be noted that while various synthetic materials may be used as coat for the sealing ring, material such as thermoplastic polymerisates have proved most convenient.

What we claim is:

1. An elastic seal for anti-friction bearings, which comprises: a spirally wound wire having its windings closely wound one over the other by leaving a narrow passage between at least some of said windings, a pair of metal rings respectively connected to the outermost and the innermost winding of said wire, one of said metal rings being provided with a peripheral circular flange having its free edge arranged to form the sealing edge for engagement with a lateral surface of a bearing ring of an anti-friction bearing, and the other of said metal rings forming the clamping surface to be clamped against the other bearing ring of said anti-friction bearing, and an elastic material completely coating all of the elements comprised by the seal.

2. An elastic seal for anti-friction bearings, which comprises: a first annular section bent to form the sealing edge for engagement with a lateral surface of a bearing ring of an anti-friction bearing, a second annular section forming the clamping surface to be clamped against the other bearing ring of said anti-friction bearing, resilient connecting means interconnecting said first and second annular sections, said connecting means forcing the sealing edge of said first annular section into direct engagement with said first named bearing ring, and a relatively thin coat of soft synthetic material covering said first and second sections, said coat at said sealing edge being open to expose said edge, said material at said sealing edge having a greater length in an axial direction than said bent section so as to be deformed in a radial direction inwardly and outwardly into lip contact with said first bearing ring, and forming with said sealing edge an additional sealing means.

3. An elastic seal according to claim 2 in which said coat of synthetic material includes a bead at said clamping surface.

4. An elastic seal according to claim 2, wherein the innermost portion of said second annular section is formed by an annular flange substantially coaxial with the central axis of said seal.

5. An elastic seal according to claim 2 wherein the connecting means interconnecting said first and second annular sections comprises a slotted disc.

6. An elastic seal according to claim 2 wherein the connecting means interconnecting said first and second annular sections comprises a spirally wound wire having its windings closely wound so as to form a disc.

7. An elastic seal according to claim 2, in which said connecting means is in the form of spokes.

8. An elastic seal according to claim 2, in which said connecting means is in the form of an annular disc of elastic material.

9. An elastic seal according to claim 3, in which the bead extends toward both sides of said second section.

References Cited in the file of this patent

UNITED STATES PATENTS

| | | |
|---|---|---|
| 1,931,733 | Leibing | Oct. 24, 1933 |
| 2,279,669 | Friskney | Apr. 14, 1942 |
| 2,467,049 | Peterson | Apr. 12, 1949 |
| 2,560,557 | Curtis | July 17, 1951 |
| 2,646,296 | Destoumieux et al. | July 21, 1953 |

FOREIGN PATENTS

| | | |
|---|---|---|
| 992,569 | France | July 11, 1951 |